(12) United States Patent
Ramaswamy et al.

(10) Patent No.: US 8,122,464 B2
(45) Date of Patent: Feb. 21, 2012

(54) METHODS AND APPARATUS TO MONITOR MEDIA CONTENT ON A CONSUMER NETWORK

(75) Inventors: Arun Ramaswamy, Tampa, FL (US); Alan Nguyen Bosworth, Odessa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 849 days.

(21) Appl. No.: 12/088,747

(22) PCT Filed: Jun. 15, 2006

(86) PCT No.: PCT/US2006/023349
§ 371 (c)(1),
(2), (4) Date: Mar. 31, 2008

(87) PCT Pub. No.: WO2007/106108
PCT Pub. Date: Sep. 20, 2007

(65) Prior Publication Data
US 2008/0320508 A1      Dec. 25, 2008

Related U.S. Application Data

(60) Provisional application No. 60/782,768, filed on Mar. 16, 2006.

(51) Int. Cl.
*H04N 60/32* (2006.01)
*H04N 7/173* (2011.01)

(52) U.S. Cl. .......... 725/16; 725/9; 725/14; 725/133; 725/141

(58) Field of Classification Search .......... 725/21, 725/37–39, 9, 14, 16, 133, 141
See application file for complete search history.

(56) References Cited

U.S. PATENT DOCUMENTS

| | | | |
|---|---|---|---|
| 6,202,210 B1 * | 3/2001 | Ludtke | 725/20 |
| 7,539,213 B2 * | 5/2009 | Guillemot et al. | 370/473 |
| 2001/0027493 A1 | 10/2001 | Wallace | |
| 2003/0066070 A1 | 4/2003 | Houston | |
| 2003/0177488 A1 | 9/2003 | Smith et al. | |
| 2004/0073916 A1 | 4/2004 | Petrovic et al. | |
| 2004/0117835 A1 | 6/2004 | Lorkovic | |
| 2005/0144632 A1 | 6/2005 | Mears et al. | |

FOREIGN PATENT DOCUMENTS

WO      2007106108      6/2007

OTHER PUBLICATIONS

International Searching Authority, International Search Report, PCT/US06/23349, 2 pages, mailed on Feb. 6, 2007.
International Searching Authority, Written Opinion of the International Searching Authority, PCT/US06/23349, 3 pages, mailed on Feb. 6, 2007.
International Preliminary Report on Patentability, PCT/US2006,023349, 4 pages, issued on Sep. 16, 2008.

* cited by examiner

*Primary Examiner* — Hunter Lonsberry
(74) *Attorney, Agent, or Firm* — Hanley, Flight & Zimmerman, LLC

(57) ABSTRACT

Example methods and apparatus to monitor media content on a consumer network as described herein. An example metering system includes a metering device to monitor the consumption of media content at a consumer location and a universal plug and play (UPnP) compatible metering helper to collect audience measurement data from UPnP devices in a consumer network.

21 Claims, 7 Drawing Sheets

| VIRTUAL CHANNEL | MEDIA SERVER | NETWORK RENDERER |
|---|---|---|
| 1 | xx.xx.xx.xx | yy.yy.yy.yy |
| 2 | aa.aa.aa.aa | bb.bb.bb.bb |
|  |  |  |
|  |  |  |

502 points to row 1.

| HELPER EVENT | |
|---|---|
| Timestamp | *Seconds since 1/1/1995* |
| State | *Play/Pause/Stop* |
| Channel | *Virtual channel on network* |
| Content URL | *Content information* |
| Time in Creative | *Elapsed time in seconds* |

602 — Timestamp
604 — State
606 — Channel
608 — Content URL
610 — Time in Creative

FIG. 6

METHODS AND APPARATUS TO MONITOR MEDIA CONTENT ON A CONSUMER NETWORK

RELATED APPLICATION

This application arises from a 371 national stage of international application serial no. PCT/US2006/023349 filed Jun. 15, 2006, which claims priority from U.S. provisional application Ser. No. 60/782,768 filed Mar. 16, 2006. Both of which are hereby incorporated by reference in their entirety

TECHNICAL FIELD

The present disclosure pertains to audience measurement and, more particularly, to methods and apparatus for monitoring media content on a consumer network.

BACKGROUND

Universal plug and play (UPnP) is a set of computer network protocols that define how networked devices discover each-other and communicate on a network. Because the UPnP architecture enables devices to automatically be configured for a given network, it is well-suited for use in consumer networks. For example, UPnP devices may be used to create a consumer network at a household.

An example UPnP consumer network may include a personal computer, a digital video recorder, and a television. In this example, when the consumer brings a laptop with wireless networking in range of the UPnP consumer network, the laptop may automatically join the UPnP consumer network, recognize devices on the network, and announce its presence to other devices on the network. The networked devices may then use the UPnP consumer network to transfer media content between one another. In addition, the devices may transmit control information (e.g., a command instructing a device to present media content), events associated with the devices (e.g., an event indicating that a device is presenting media content), and user interface components (e.g., a webpage that allows users to control devices).

Television ratings information is typically generated by collecting viewing records and/or other viewing information from a group of statistically selected households. Each of the statistically selected households typically has a data logging and processing unit commonly referred to as a "home unit." The home unit is often in communication with a variety of attachments that provide inputs to the home unit or receive outputs from the home unit. The home unit usually processes the inputs (e.g., channel tuning information, viewer identities, etc.) from the attachments to produce viewing records. Viewing records may be generated on a periodic or aperiodic basis (e.g., at fixed time intervals or in response to events such as a change in the identit(ies) of the person(s) viewing the television, a change in the channel tuning information (i.e., a channel change), etc). Each viewing record typically contains channel information such as a station or channel number and a time (e.g., a date and time of day) at which the channel was viewed. Of course, viewing records may contain other information such as the identities of viewers present at the viewing time.

Often, the home unit collects a number of viewing records and transmits collected viewing records to a central data processing facility for further processing or analysis. The central data processing facility receives viewing records from home units located in some or all of the statistically selected households and analyzes the viewing records to ascertain the viewing behavior(s) of a particular household or a particular group of households selected from all participating households. Additionally, the central data processing facility may generate viewing behavior statistics and/or other parameters indicative of viewing behavior associated with some or all of the participating households and/or with demographic or other groups that are represented by the particular household.

To generate viewing behavior information from viewing records, the central data processing facility may compare reference data such as a list of programs (i.e., a schedule of television programming or television guide) to the viewing records. In this manner, the central data processing facility can infer which program was viewed by matching the time and channel information in a viewing record to the program associated with that same time and channel in the program schedule. Such a matching process can be carried out for each of the viewing records received by the central data processing facility, thereby enabling the central data processing facility to reconstruct what programs were watched by all participating households and the times at which the programs were watched.

Other manners of identifying programs are known. For example, the home unit or other metering device can collect codes broadcast with media content to identify the consumer(s) and/or the media content. Alternatively or additionally, the home unit or the metering device may collect samples of the consumed media content or proxies for those samples to be compared against a database of known samples/proxies to identify the media content.

BRIEF DESCRIPTION OF THE DRAWINGS

FIG. 5 is a table illustrating an example virtual channel list.

FIG. 6 is a table illustrating an example helper event.

DETAILED DESCRIPTION

Figure 1:
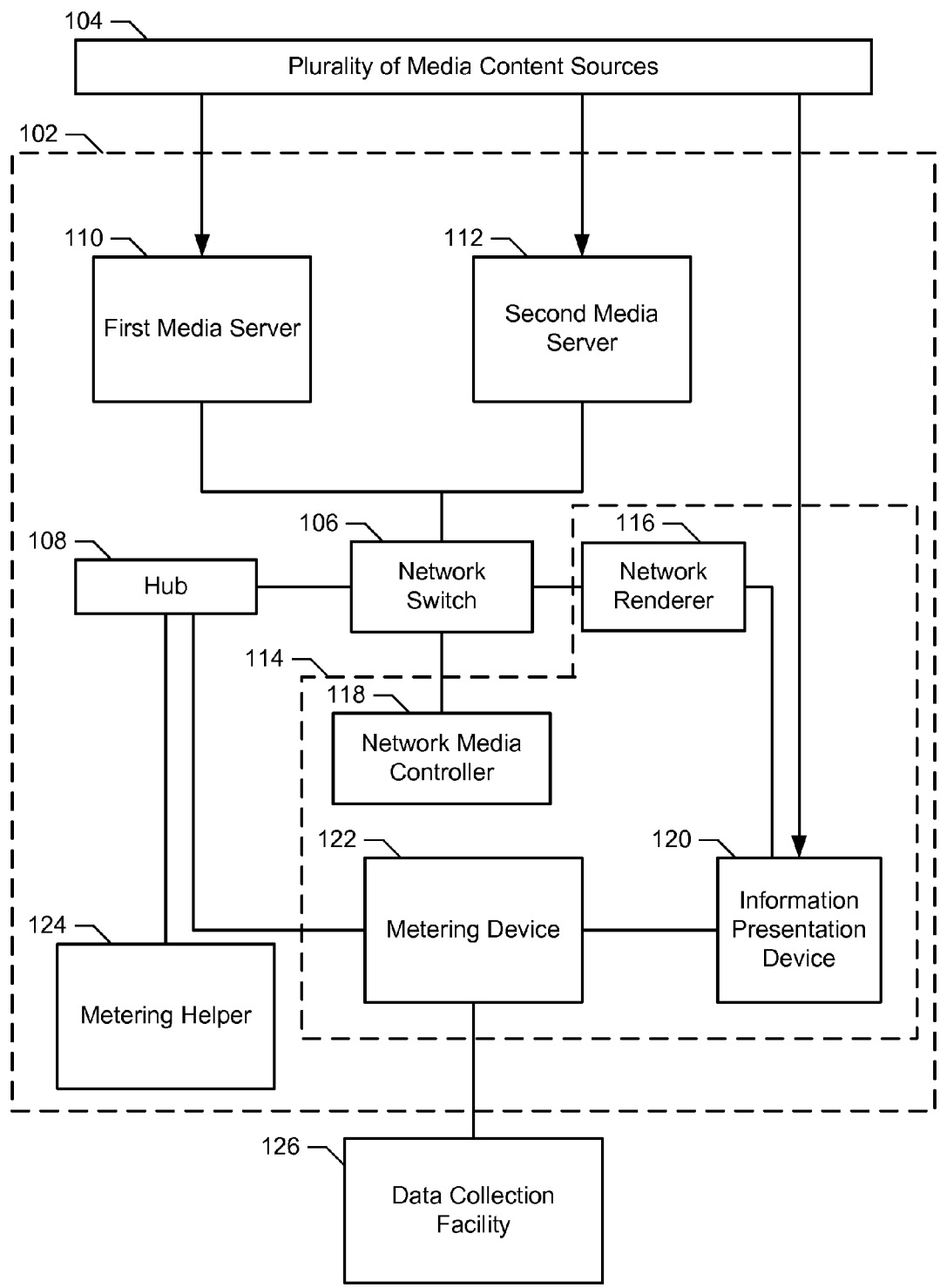
FIG. 1 is a block diagram of an example system to monitor media content on a consumer network.

An example system to monitor media content on a consumer network comprising universal plug and play (UPnP) devices is illustrated in FIG. 1. The example methods and apparatus described herein may be used to monitor media content that is transmitted and/or presented by UPnP capable devices. In the example methods and apparatus, a metering device comprises or is associated with a metering helper. The metering helper is capable of joining a UPnP device network, locating and communicating with UPnP devices on the UPnP device network, and storing information about the UPnP devices (e.g., location, status, etc.) on the UPnP device network. In particular, the metering helper may receive events output by a UPnP device indicating that the device is starting presentation of media content, stopping presentation of media content, transmitting media content to another location, etc. The metering helper communicates information about the events to the metering device for storage and/or analysis.

As used herein, media content refers to any audio and/or visual material. Thus, radio programming, television programming, internet content, and/or any other type of consumable content is media content.

FIG. 1 is a block diagram of an example system to monitor media content on a consumer network. A consumer network may include any group of devices at a consumer location communicatively coupled to transmit media content that is received from an upstream broadcast source. A consumer network may be a wired and/or wireless network of connected devices in a home, a wired and/or wireless network of connected devices in an office, etc. FIG. 1 includes a consumer network 102 that is fed by a plurality of media content sources 104 and communicatively coupled to a data collection facility 126. The consumer network 102 may be any local network that is capable of presenting media content to a consumer such as, for example, a network at a household, a network at an office building, a network at a conference facility, a network at a hotel/motel, a network at a business, etc. The plurality of media content sources 104 may be any source(s) of media content that may be supplied to a consumer network 102. Examples of media content sources 104 include satellite television, satellite radio, cable television, cable radio, broadcast television, broadcast radio, internet media content, media content stored on consumer devices (e.g., portable media players, personal video recorders, digital video recorders, video cassette recorders, video gaming systems, etc.), video on demand (VOD), or any other source of media content.

The example consumer network 102 of FIG. 1 includes a network switch 106, a hub 108, a first media server 110, a second media server 112, a metering helper 124, and a presentation location 114. The presentation location 114 includes a network renderer 116, a network media controller 118, an information presentation device 120, and a metering device 122. Although for purposes of explanation, a representation of an example consumer network 102 and an example presentation location 114 located inside of that consumer network 102 is shown in FIG. 1, persons of ordinary skill in the art will recognize that some or all of these or other components may be located in different locations of the consumer network 102 and/or may be located in multiple consumer locations. In addition, one or more consumer locations 102 may include other numbers of components than those shown in FIG. 1 including multiple viewing locations 102 and/or multiple media servers, multiple presentation locations, and/or multiple hubs and/or switches (as will be described further below).

The network switch 106 and hub 108 are devices for providing communication between a plurality of devices on a network. The consumer network 102 of the illustrated example operates according to a universal plug and play (UPnP) network architecture. UPnP allows devices to be connected to a network and allows devices to recognize other devices on a network. Of course, any other suitable network architecture including updates to and/or replacements for UPnP may be used to provide communication amongst network devices. In addition, any type of network connection(s) may be used to connect devices such as, for example, an optical network, a wired network, a wireless network, devices connected via a universal serial bus (USB), a firewire network, etc. Media content and control instructions transmitted on the network may be communicated using any network protocol such as, for example, the hypertext transport protocol (HTTP), the real-time transport protocol (RTP), the transmission control protocol and/or internet protocol (TCP/IP), the user datagram protocol (UDP), etc. The network configuration shown in FIG. 1 is for illustration purposes and it should be understood that any network configuration capable of providing communication between a plurality of devices may be used. Further, a network configuration may include any number of network switches 106 and/or hubs 108.

The first media server 110 and the second media server 112 of the illustrated example are able to receive media content from one or more of the plurality of media content sources 104 and are connected to the network switch 106 to provide communication with other devices. The first and second media servers 110 and 112 may store received media content for later transmission to other connected devices and/or may immediately transmit the media content to other connected devices. For example, the first media server 110 may be implemented by a personal computer (PC) and the second media server 112 may be implemented by a digital video recorder (DVR). Other devices capable of receiving and transmitting media content may additionally or alternatively implement the media servers. For example, either or both of the media servers may be implemented by a video game console, a television set, a video cassette player/recorder, a digital versatile disk (DVD) player/recorder, a media center PC, a portable media player, and/or a personal video recorder (PVR). While the example consumer network 102 shown in FIG. 1 includes two media servers, persons of ordinary skill in the art will appreciate that a consumer location may include no media servers or may alternatively include any other number of media servers (e.g., 1, 3, 4, 5, etc.).

The presentation location 114 may be any location serviced by the consumer network 102 in which a consumer may be presented with media content. A consumer network 102 may include multiple presentation locations 114. For example, a household may include a plurality of presentation locations 114 such as, for example, a bedroom including a television and/or a radio, another bedroom including a radio, a living room including a computer and/or a television, a kitchen including a television and/or a radio, etc.

The network renderer 116 of the illustrated example is capable of communicating with and/or receiving media content from the first and/or second media servers 110 and 112. The network renderer 116 is also capable of transmitting the received media content in a format suitable for presentation by the information presentation device 120. The network renderer 116 may additionally provide an audible and/or a visible user interface for presentation by the information presentation device 120. The example network renderer 116 shown in FIG. 1 is capable of operating according to the UPnP network architecture to communicate with other devices on the network. Example network renderers include the D-Link® DSM 302 Media Player and/or media extenders compatible with Microsoft® Windows XP® Media Center Edition.

The network media controller 118 of the illustrated example is capable of controlling the flow of media content on the consumer network. For example, the network media controller 118 controls what media content is sent to the network renderer(s) 118 available on the consumer network. The network media controller 118 (1) may be a standard remote control that is capable of controlling the first and second media servers 110 and 112 and/or the network switch 106, (2) may be a device capable of receiving information from the first and second media servers 110 and 112 and responding with instructions, (3) may be integrated in the network renderer 116 to provide a user interface for the consumer to control the transmission of media content, and/or (4)

may be any other device capable of controlling the transmission of media content on the consumer network.

The information presentation device 120 of the illustrated example receives media content from the network renderer 116 and/or from one or more of the plurality of media content sources 104 and presents the received media content for consumption by a local audience. The information presentation device 120 may also present a user interface supplied by the network renderer 116. The information presentation device 120 may be any device capable of presenting media content to a consumer. For example, the information presentation device 120 may be a television, a radio, a set top box, a computer, a stereo, a portable television device, a portable media device, a cellular phone, a portable audio device such as an MP3 player, a personal digital assistant, etc. The information presentation device 120 may additionally or alternatively be composed of a combination of devices such as, for example, a television with a VCR attached or integrated therein, a television with a PVR attached or integrated therein, or a radio with a tape recorder attached or integrated therein. In a combination of devices, the network renderer 116 may be connected to, for example, the recording component, which may record the media content and/or transmit the media content to the presentation component.

The metering device 122 of the illustrated example is capable of monitoring the consumption of media content at the information presentation device 120. The metering device 122 may additionally be capable of monitoring the audience members consuming media content from the information presentation device 120 to determine, for example, the number of audience members present, demographics of audience members present, etc. The metering device 122 may employ one or more of a variety of methods to determine the source and/or identity of media content that is presented at the information presentation device 120. For example, the metering device 122 may extract and/or record ancillary codes (e.g., audio and/or video codes identifying the corresponding program and/or station) embedded in the media content, signatures (e.g., a portion of a program signal or proxy therefore representing a characteristic of the content signal) extracted from the media content, metadata (e.g., URLs, packet headers, etc.) attached to or embedded in the media content, or any other method to determine the source and/or identity of the media content. Example methods and apparatus for identifying media content received from a broadcast source (such as the plurality of media content sources 104) are described in U.S. Pat. No. 5,481,294 and pending U.S. patent application Ser. No. 09/955,691, which are incorporated herein by reference in their entirety. The identification of media content received from the consumer network is described in further detail in conjunction with the metering helper 124. Metering data that is received, generated, and/or extracted from the media content may be transmitted to the data collection facility 126 for analysis. The data collection facility 126 may be any location(s) capable of receiving media content and/or metering data for storage, and/or analysis. The data collection facility 126 is typically a remote location associated with an audience measurement company communicatively coupled to the metering device 122 of the consumer network 102 via wired or wireless (e.g., cellular) telephone, wide area network, internet, etc.

The metering helper 124 of the illustrated example is capable of assisting the metering device 122 in identifying media content that is received from the consumer network (e.g., transmitted from the first and/or second media servers 110, 112 to the network renderer 116 and transmitted from the network renderer 116 to the information presentation device 120). The example metering helper 124 is a UPnP device that is capable of recognizing and communicating with other devices on the consumer network. However, the metering helper 124 could utilize any other method or protocol compatible with the consumer network.

The metering helper 124 of the illustrated example is capable of generating a list of devices present on the consumer network, a list of available media content on the consumer network, and/or a list of media content currently being transmitted on the consumer network. The metering helper 124 is further capable of transmitting the generated list(s) to the metering device 122. The metering device 122 of the illustrated example use(s) the generated list(s) to assist in identifying media content that has been transmitted over the consumer network. For example, the metering device 122 may determine that the information presentation device 120 is presenting media content from the network renderer 116 and may determine the identity and/or source of that media content from the generated list(s) received from the metering helper 124. The metering device 122 may additionally transmit the generated lists along with any metering data to the data collection facility 126 to facilitate analysis of the metering data by the data collection facility 126.

While the example metering helper 124 of FIG. 1 is illustrated as a standalone device, the metering helper 124 may alternatively be integrated with any other device on the consumer network 102. For example, the metering helper 124 may be integrated with the metering device 122, the network media controller 118, the information presentation device 120, the network renderer 116, the first media server 110, the second media server 112, the hub 108, and/or the network switch 106. In addition, if the data collection facility 126 is connected to the consumer network 102, the metering helper 124 may be integrated with the data collection facility 126.

Figure 2:
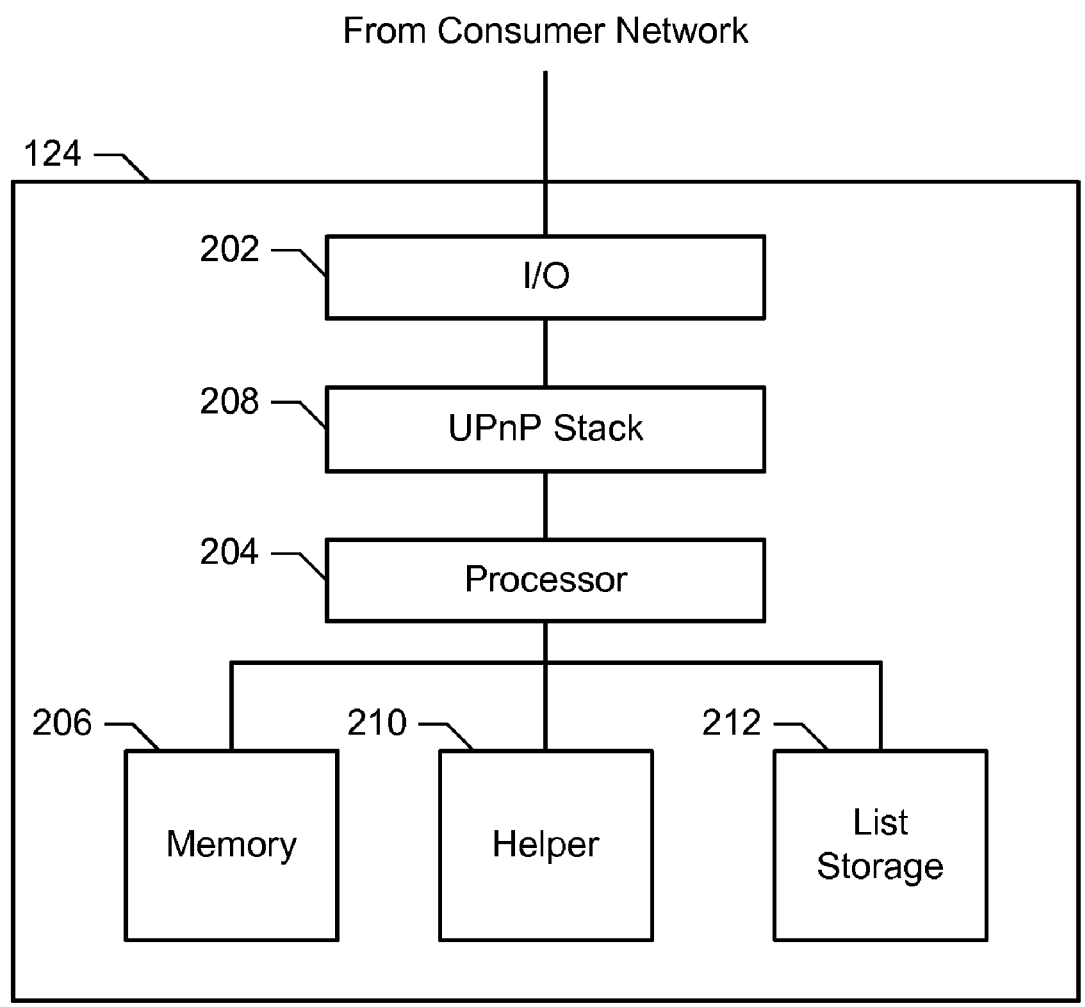
FIG. 2 is a block diagram of the example metering helper of FIG. 1.

FIG. 2 is a block diagram of an example implementation of the example metering helper 124 of FIG. 1. The metering helper 124 includes an input and output component (I/O) 202, a processor 204, a memory 206, a UPnP stack 208, a helper 210, and a list storage 212.

The I/O component 202 of the example metering helper 124 is an Ethernet network connection. However, the I/O component 202 may be implemented using any communications method compatible with the consumer network such as, for example, a wireless network connection, a serial connection, a USB connection, a firewire connection, etc.

The processor 204 of the illustrated example is capable of executing instructions stored in the memory 206 to perform the functions of the metering helper 124. For example, the processor may execute instructions to control the transmission of information between the helper 210 and the list storage 212. The processor may be any type of processor and is further described in conjunction with FIG. 7.

The memory 206 is capable of storing data and instructions for the operation of the metering helper 124. For example, the memory 206 may store instructions for execution by the processor 204. The memory 206 may be implemented using any type of memory and may additionally be implemented using multiple memory components and/or multiple memory types. Example available memory types are described in further detail in conjunction with the description of FIG. 7.

The UPnP stack 208 of the illustrated example controls communication between devices on the consumer network and the metering helper 124. In particular, the UPnP stack 208 is responsible for: 1) obtaining an address on the consumer network (e.g., assigning itself a valid address, receiving an address from a dynamic host configuration protocol (DHCP) server, etc.), 2) discovering other devices connected to the consumer network, and 3) reporting the capabilities of the metering helper 124 to the other devices on the network. Common UPnP devices are capable of performing the three responsibilities identified in the foregoing sentence and the responsibilities are, thus, not described in further detail herein. In addition to containing instructions for performing the standard responsibilities/functionalities of the UPnP stack 208, the UPnP stack 208 of the metering helper 124 also contains instructions that allow the metering helper 124 to perform media metering tasks. For example, the UPnP stack 208 contains instructions that allow the metering helper 124 to: 1) control devices connected to the consumer network, 2) handle events transmitted by devices on the consumer network (e.g., an event or instruction from the network media controller 118 to the first media server 110 to send media content to the network renderer 116), and 3) present a web page interface (not shown) for the metering helper 124.

The helper 210 of the illustrated example receives information from devices on the consumer network via the UPnP stack 208 and the I/O component 202. The helper 210 processes and/or analyzes the information to retrieve information about the media content and/or to identify the media content. In addition, the helper 210 transmits the information to a metering device (e.g., the metering device 122 of FIG. 1) and/or a data collection facility (e.g., the data collection facility 126 of FIG. 1) via the I/O component 202. For example, the helper 210 may receive an event notification from a PVR indicating that the PVR has begun playback of media content. The helper 210 may respond to this notification by extracting the title and/or identifier for the media content and/or the PVR and send a time-stamped message to a metering device indicating that the PVR has begun playback of the media content.

The list storage 212 contains/stores data list(s) generated by the metering helper 124. For example, the list storage 212 may store list(s) of devices present on the consumer network, list(s) of available media content on the consumer network, and/or list(s) of media content currently being transmitted on the consumer network.

Figure 3:
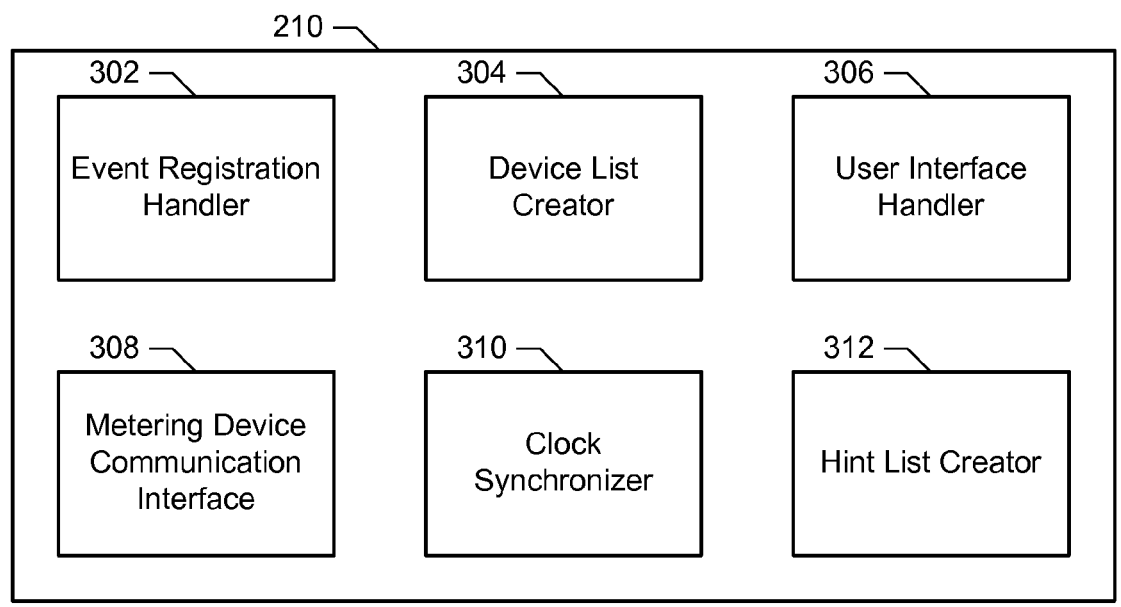
FIG. 3 is a block diagram of the example metering helper of FIG. 2.

FIG. 3 is a block diagram of the example helper 210 of FIG. 2. The helper 210 of the illustrated example includes hardware, software, and/or firmware that allows the metering helper 124 to operate as an Event Registration Handler 302, a Device List Creator 304, a User Interface Handler 306, a Metering Device Communication Interface 308, a Clock Synchronizer 310, and/or a Hint List Creator 312. Of course, any combination of these components may be used and/or other components may be added to the helper 210 as desired.

The event registration handler 302 of the illustrated example contains hardware, software, and/or firmware that allows the metering helper 124 to register for events at UPnP capable devices on the consumer network and receive events output by UPnP capable devices on the consumer network. The event registration handler 302 of the illustrated example utilizes the event portion of the UPnP stack 208 to receive any and/or all events transmitted over the consumer network. The event registration handler 302 is further capable of determining the purpose of the event and recording the purpose of the event in the list storage 212. For example, the event registration handler 302 may receive an event from the network media controller 118 instructing the second media server 112 to transmit a specific media content program to the network renderer 116 for presentation on the information presentation device 120. The event registration handler 302 may record the event in the list storage 212 indicating the time, the date, the operation requested by the event (e.g., play, pause, stop), the source of the media content (e.g., channel number on a broadcast network), and/or the content location (e.g., a uniform resource locator (URL)). Of course, this list of attributes is only an example and any number of these and/or other attributes may be recorded.

The device list creator 304 of the illustrated example is capable of generating a list of available devices on the consumer network. The device list creator 304 may utilize functionality of the UPnP architecture to query the network for a list of available devices. For example, the device list creator 304 may broadcast a request for network devices to announce themselves and record any information received from the devices that respond. Alternatively, devices may automatically broadcast identifying/descriptive information upon recognizing the addition of a device to the consumer network or when they are first added to a consumer network. The device information list may include, for each device, the network address of the device, the type of device (e.g., network renderer, media server, network media controller, etc.), and a nickname for the device. The list of available devices may be stored in the list storage 212.

The user interface handler 306 of the illustrated example generates a user interface useful for configuring the helper 210. The user interface handler 306 of the illustrated example additionally generates a user interface to enable users to control the presentation of media content at any presentation location. The user interface generated by the user interface handler 306 may include information regarding the status of the helper 210 and/or any errors that occur during the operation of the helper 210.

The metering device communication interface 308 of the illustrated example is responsible for handling communication with any metering device(s) on the consumer network. The metering device communication interface 308 works in conjunction with the UPnP stack 208 and/or the device list creator 304 to obtain a list of metering devices on the network. Alternatively, the list of metering devices on the network and their respective locations may be manually programmed on the metering helper 124. The metering device communication interface 308 is further responsible for transmitting lists stored in the list storage 212 to any metering devices on the consumer network.

The clock synchronizer 310 of the illustrated example is responsible for synchronizing an internal clock of the helper 210 with an internal clock in the metering device(s) attached to the consumer network. Synchronizing the clocks 210 and 310 ensures that timestamp records created on any of the devices attached to the network will also be synchronized. The clock synchronizer 310 of the illustrated example functions in conjunction with the metering device communication interface 308 to obtain the internal clock time of the metering device 122 and/or to change the internal clock time of the metering device 122.

The hint list creator 312 of the illustrated example is responsible for compiling the list(s) of data regarding media content that is transmitted over the consumer network. The hint list creator 312 of the illustrated example generates a virtual channel list (i.e., a hint list) of active media content on each of the first and second media servers 110 and 112. In the illustrated example, the virtual channel list is stored at the metering helper 124 of FIG. 1. Additionally or alternatively, the virtual channel list may be transmitted to one or more of the metering device 122 or the data collection facility 126. In the illustrated example, the virtual channel list is a UPnP traffic log file. Persons of ordinary skill in the art will recognize that the virtual channel list may alternatively be generated based on information transmitted on the network or based on information returned by a query of devices connected to the network.

An example virtual channel list is illustrated in FIG. 5. Virtual channels are representative numbers generated and assigned to media content transmissions. Each entry in the virtual channel list corresponds to a transmission of media content from one or more of the media servers 110, 112 to one or more of the media renderers 116 and/or other devices on the consumer network. The virtual channel list includes the virtual channel number assigned to the transmission (column 1 of the list in FIG. 5), a network address of the media server (column 2 of the list in FIG. 5), and a network address of the network renderer (column 3 of the list in FIG. 5). For example, entry 502 of FIG. 2 indicates that transmissions from the media server at network address xx.xx.xx.xx to the network rendered at network address yy.yy.yy.yy is assigned virtual channel number 1. The hint list creator 312 of the illustrated example is additionally responsible for generating helper events.

The helper events contain information about the media content that is transmitted to one or more network renderers, such as network renderer 116. The example hint list creator 312 operates in conjunction with the event registration handler 302 to generate helper events. When the event registration handler 302 receives an event regarding media content at the network renderer 116, the hint list creator 312 creates a new helper event.

An example helper event 600 that may be created by the example hint list creator 312 of FIG. 3 and stored in the list storage 212 of FIG. 2 is illustrated in FIG. 6. The example helper event 600 includes a timestamp 602, a state 604, a channel 606, a content URL 608, and a time in creative 610. The timestamp 602 is assigned by the hint list creator 312. The timestamp may be any timestamp value such as, for example, the number of seconds that have elapsed since 12:00:00 AM on Jan. 1, 1995. The state 604 indicates the command state associated with the helper event 600. For example, the state may indicate that the event is associated with the playing of media content, the pausing of media content, the stopping of media content, the rewinding of media content, and/or the forwarding of media content. The channel 606 indicates the virtual channel number associated with the helper event 600. The content URL 608 indicates the universal resource locator (URL) associated with the content. For example, the content URL 608 may be "\aaa\6 pm new-.mpg". The time in creative 610 indicates an amount of time that has elapsed. For example, the time in creative 610 may indicate that the media content has been paused for 12 seconds, that the media content has been in playback for 15 minutes, etc.

Figure 4:
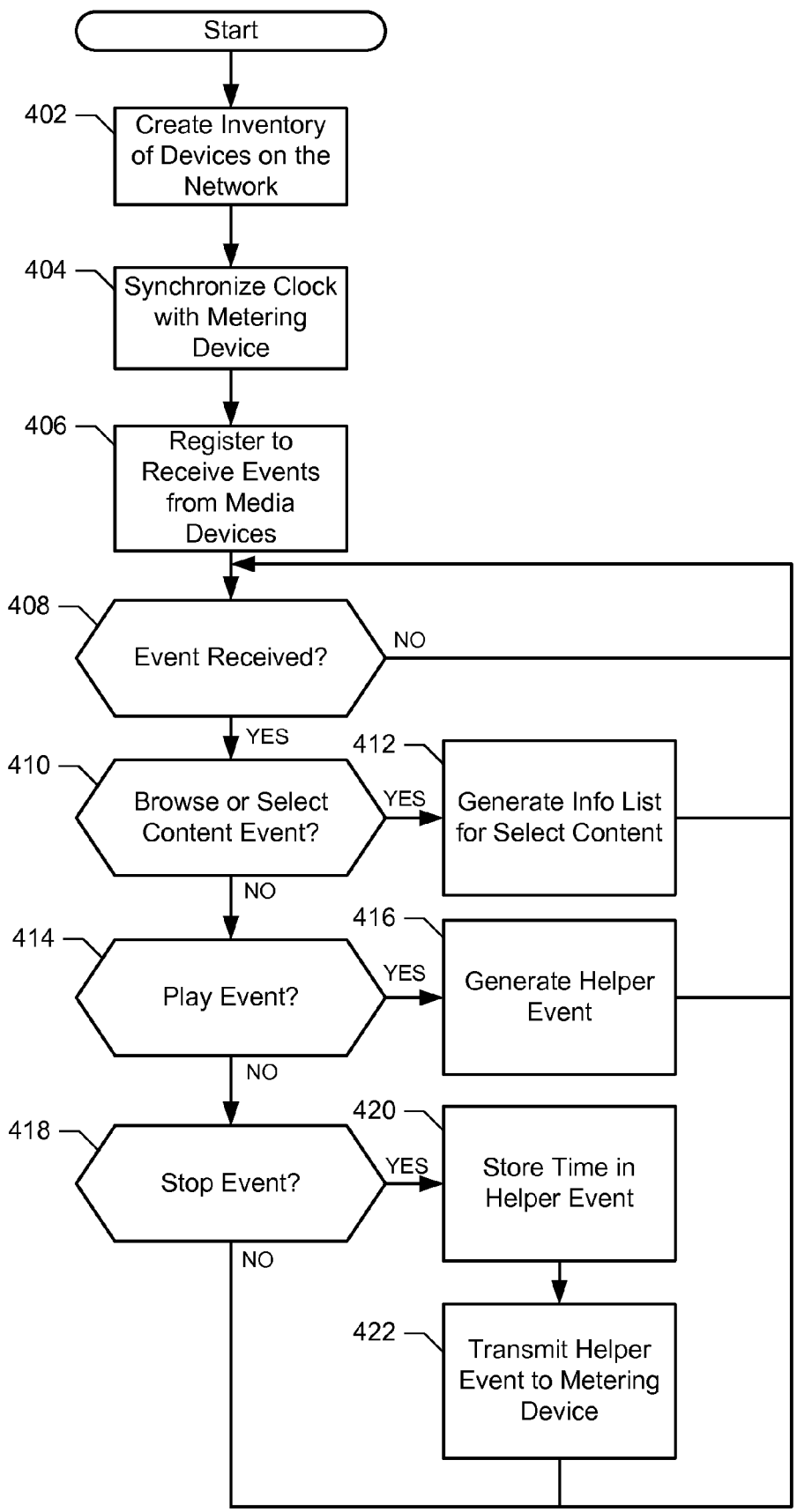
FIG. 4 is a flowchart representative of example machine readable instructions which may be executed to implement the metering helper of FIG. 1

A flowchart representative of example machine readable instructions for implementing the metering helper 124 of FIG. 1, the metering helper 124 of FIG. 2, the helper 210 of FIG. 2, and/or the helper 210 of FIG. 3 is shown in FIG. 4. In this example, the machine readable instructions comprise a program for execution by a processor such as the processor 712 shown in the example computer 700 discussed below in connection with FIG. 7. The program may be embodied in software stored on a tangible medium such as a CD-ROM, a floppy disk, a hard drive, a digital versatile disk (DVD), or a memory associated with the processor 712, but persons of ordinary skill in the art will readily appreciate that the entire program and/or parts thereof could alternatively be executed by a device other than the processor 712 and/or embodied in firmware or dedicated hardware in a well known manner. For example, any or all of metering helper 124, the I/O 202, the processor 204, the memory 206, the UPnP stack 208, the helper 210, the list storage 212, the event registration handler 302, the device list creator 304, the user interface handler 306, the metering device communication interface 308, the clock synchronizer 310, and/or the hint list creator 312 could be implemented by software, hardware, and/or firmware. Further, although the example program is described with reference to the flowcharts illustrated in FIG. 4, persons of ordinary skill in the art will readily appreciate that many other methods of implementing the metering helper 124 of FIG. 1, the metering helper 124 of FIG. 2, the helper 210 of FIG. 2, and/or the helper 210 of FIG. 3 may alternatively be used. For example, the order of execution of the blocks may be changed, and/or some of the blocks described may be changed, eliminated, or combined.

The example machine readable instructions of FIG. 4 begin with the metering helper 124 first creating an inventory of available devices on the consumer network (block 402). This device inventory list creation may be done by the device list creator 304. In addition to creating the device inventory list, the hint list creator 312 of the metering helper 124 may additionally generate a virtual channel list of active media content on the consumer network. After creating the device inventory list and the virtual channel list, the clock synchronizer of the metering helper 124 synchronizes the internal clock with the internal clocks of any metering devices attached to the consumer network (block 404). Then, the event registration handler 302 of the metering helper 124 registers to receive events from the media device(s), metering device(s), and/or other device(s) attached to the consumer network (block 406).

The metering helper 124 of the illustrated example then enters a loop to detect events transmitted on the consumer network. When an event is received (block 408), the metering helper 124 classifies it and completes a corresponding action. If a consumer browses or selects some available media content (block 410), control moves to block 412. The metering helper 124 then retrieves or generates identification information about the content selected using the hint list creator 312 (block 412). The metering helper 124 may receive identification information about media content as it is transmitted from one of the media servers 110 and 112 to the network renderer 116 or may instruct the media servers 110 and 112 to transmit identification information directly to the metering helper 124. Following the generation or reception of identification information (block 412), the metering helper 124 returns to block 408 to wait for an event to be transmitted on the consumer network.

If the event received from the consumer network indicates the consumer elected to play media content (block 414), control moves to block 416. The metering helper 124 then uses the hint list creator 312 to generate a helper event corresponding to the media content that is to be played (block 416). Following the generation of the helper event, control returns to block 408 to wait for an event to be transmitted on the consumer network.

If the event received from the consumer network indicates the consumer has elected to stop/halt the presentation of media content (block 418), control moves to block 420. The metering helper 124 then uses the hint list creator 312 to complete the previously generated helper event (generated when the media content was first played) by storing the end time or the duration of the playback of the media content (block 420). The helper event is then transmitted via the metering device communication interface 308 to the metering device that corresponds to the location at which the media content was presented (block 422). The metering helper 124 may additionally or alternatively transmit the helper event to other locations, including to other metering devices and/or a remote data collection facility. Alternatively, the metering helper 124 may store the helper event with other helper events for transmission of a plurality of helper events at a later time. After transmitting the helper event, control returns to the block 408 to wait for an event to be transmitted on the consumer network.

Figure 7:
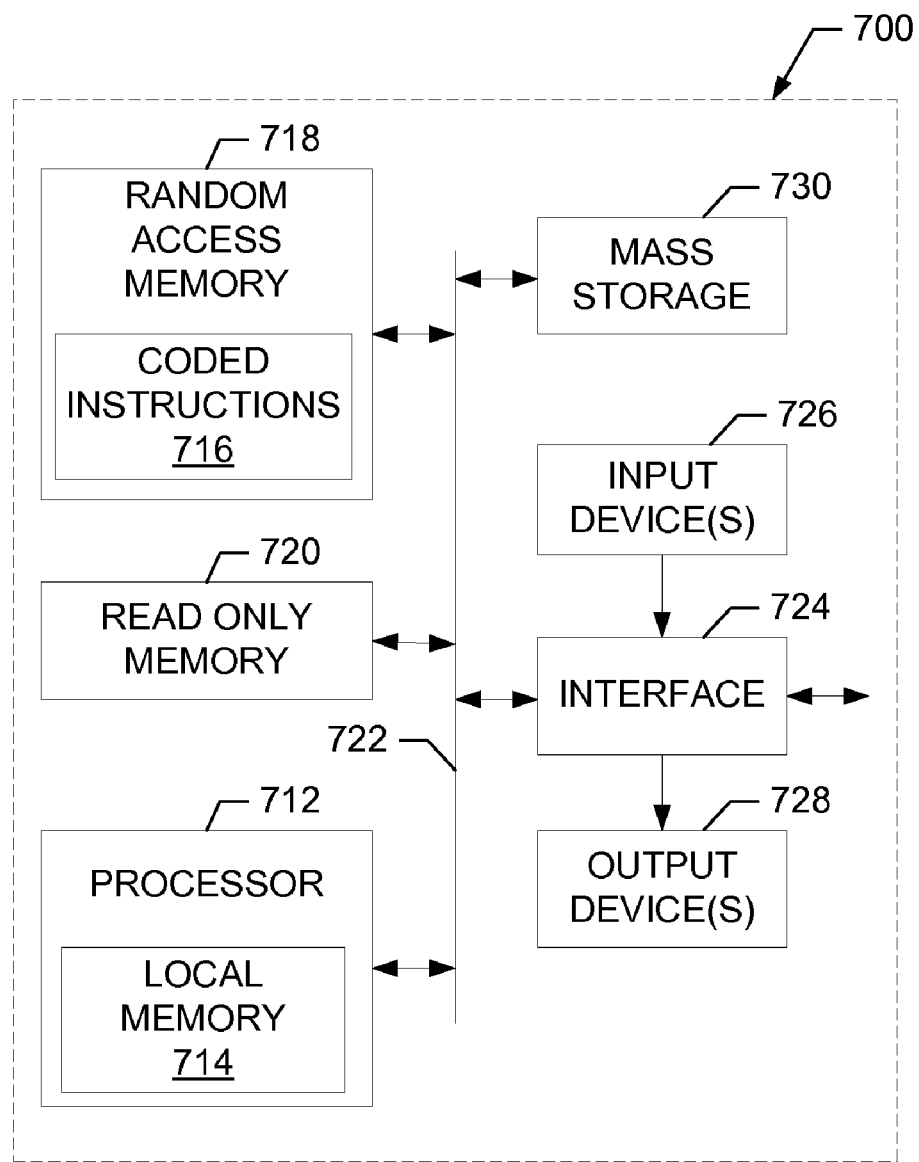
FIG. 7 is a block diagram of an example computer system that may be used to execute the machine readable instructions represented by FIG. 4 to implement the example metering helper of FIG. 3.

FIG. 7 is a block diagram of an example computer 700 capable of implementing the apparatus and methods disclosed herein. The computer 700 can be, for example, a server, a personal computer, a personal digital assistant (PDA), an Internet appliance, a DVD player, a CD player, a digital video recorder, a personal video recorder, a set top box, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, the example machine readable instructions illustrated in FIG. 4. The processor 712 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 712 is in communication with a main memory including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown) in a conventional manner.

The computer 700 also includes a conventional interface circuit 724. The interface circuit 724 may be implemented by any type of well known interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device such as a modem or network interface card to facilitate exchange of data with external computers via a network (e.g., an Ethernet connection, a wireless network connection (e.g., a Bluetooth wireless network connection, a network connection that operates according to any of the 801.11 protocols, an infrared connection, etc.), a FireWire connection, a universal serial bus (USB) connection, a digital subscriber line (DSL), a telephone line, coaxial cable, a cellular telephone system, etc.).

The computer 700 also includes one or more mass storage devices 730 for storing software and data. Examples of such mass storage devices 730 include floppy disk drives, hard drive disks, compact disk drives, and digital versatile disk (DVD) drives. The mass storage device 730 may implement all or a part of the memory 206 of FIG. 2.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of monitoring media content comprising:
identifying a first device that supports universal plug and play (UPnP);
receiving a UPnP event from the first device;
analyzing the UPnP event to determine if the first device is at least one of presenting media content or displaying a list of available media content; and
transmitting information based on the analysis to a metering device attached to the first device.

2. A method as defined in claim 1, further comprising transmitting the information to a data collection facility.

3. A method as defined in claim 1, further comprising synchronizing a clock with a clock associated with a metering device.

4. A method as defined in claim 1, wherein the first device is attached to a network.

5. A method as defined in claim 4, further comprising generating a list of devices connected to the network based on information published by the devices via a UPnP protocol.

6. A method as defined in claim 4, further comprising generating a list of media content associated with devices connected to the network.

7. A method as defined in claim 6, wherein the list of media content comprises an entry for each media content available.

8. A method as defined in claim 7, further comprising assigning a virtual channel identifier to each entry in the list of media content.

9. A method as defined in claim 1, further comprising generating a list of media content associated with the first device.

10. A method as defined in claim 1, further comprising registering to receive UPnP events from the first device.

11. A method as defined in claim 1, wherein the information is stored in a helper event.

12. A method as defined in claim 11, wherein the helper event comprises at least one of a timestamp, a state, a channel identifier, a universal resource locator (URL), or a time in creative.

13. A method as defined in claim 1, wherein the metering device is attached to the media presentation device by a connection other than the UPnP network.

14. An apparatus comprising
a universal plug and play (UPnP) stack to communicate with devices on a UPnP network, to identify a first device that supports universal plug and play (UPnP), and to receive a UPnP event from the first device;

a helper to analyze the UPnP event to determine if the first device is at least one of presenting media content or displaying a list of available media content; and an interface to transmit information based on the analysis to a metering device separate from the apparatus and attached to the first device.

15. An apparatus as defined in claim 14, wherein the helper is further to synchronize a clock with a clock associated with a metering device.

16. An apparatus as defined in claim 14, wherein the first device is attached to a network.

17. An apparatus as defined in claim 16, wherein the helper is further to generate a list of devices connected to the network based on information published by the devices via a UPnP protocol.

18. An apparatus as defined in claim 16, wherein the helper is further to generate a list of media content associated with devices connected to the network.

19. An apparatus as defined in claim 14, wherein the helper comprises at least one of:

an event registration handler to register to receive UPnP events from the first device;

a device list creator to generate a list of devices connected to the UPnP network;

a user interface handler to generate a user interface for configuring the apparatus;

a metering device communication device to communicate with a metering device;

a clock synchronizer to synchronize a clock with a clock associated with a metering device; and and a hint list creator to generate a list of media content associated with devices connected to the UPnP network.

20. A metering system comprising:

a metering device attached to a media content presentation device to monitor the consumption of media content at the media content presentation device; and a universal plug and play (UPnP) compatible metering helper to collect audience measurement data from UPnP devices in a consumer network and to transmit the audience measurement data to the metering device.

21. A metering system as defined in claim 20, wherein the UPnP compatible metering helper is further to:

communicate with devices on a UPnP network;

identify a first device that supports UPnP, and to receive a UPnP event from the first device;

analyze the UPnP event to determine if the first device is at least one of presenting media content or displaying a list of available media content; and store information based on the analysis.

* * * * *